United States Patent Office 3,061,265
Patented Oct. 30, 1962

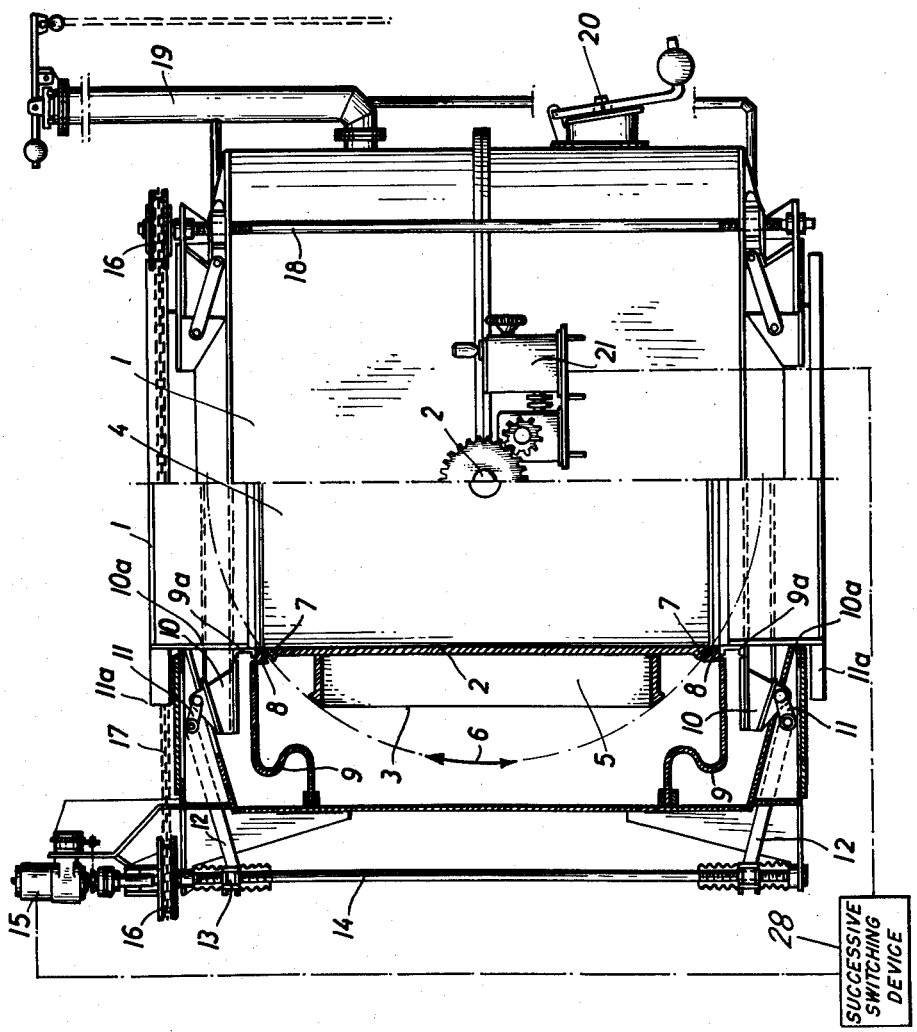

3,061,265
MOTOR OPERATED ROTARY VALVE
Eduard Schiegries, deceased, late of Wolfenbuttel, Germany, by Elsa Schiegries, née Fecker, widow and sole heir, Wolfenbuttel, Germany, assignor to Hermann Rappold & Co. G.m.b.H., Duren-Birkesdorf, Germany
Filed Dec. 16, 1958, Ser. No. 782,347
4 Claims. (Cl. 251—134)

This invention relates to a valve for opening and closing tubular conduits for example for gas pipes of large cross-section, such as are used for conveying hot dust-containing waste gases from blast furnaces. Sliding plate valves are mainly used for this purpose, the sliding plate of the valve being moved between two sealing members or guides which are fitted in a closed casing. These known sliding plate valves have the disadvantage that they easily become distorted in the hot gas and their sealing surfaces lose their gas tightness.

These disadvantages of the known sliding plate valves are obviated, in accordance with the invention, by using as a valve for the pipe or conduit a rigid rotary body, similar to a cock, having a bore the cross-section of which corresponds to the cross-section of the pipe and which is mounted in a casing between sealing rings which are movable in the direction of the pipe and are adapted to be connected with the ends of the pipe, which sealing rings, for sealing the gas passage through the valve are pressed against part-spherical sealing surfaces on the rotary member and are released from these surfaces to enable the rotary body to be rotated to close the gas passage.

The idea of attaching the movable sealing rings to the ends of the pipe, which can be effected, for example, by a sliding joint or by interposing flexible walls between the rings and the pipe ends, enables the space between the casing and the sealing surfaces to be ventilated or even to be filled with a protective gas, so that a tight and secure closure of the closure member is ensured.

The displacement of the sealing rings within the casing can be effected by means of a linkage which can be driven by a motor. Similarly, the rotary member or cock which is mounted on trunnions in the casing can be rotated by a motor.

According to a further feature of the invention the means for moving the rotary body and the sealing rings are controlled by an electrical switching device which automatically regulates their movements one after the other and is actuated by a single press-button switch.

A constructional example of the invention is illustrated in the accompanying drawing partly in elevation and partly in section.

Referring to the drawing, in the gas pipe is fitted a cylindrical casing 1 in which a rotary body which acts like a cock, can turn about two trunnions 2. The rotary member consists of two cylinders 3 and 4. These cylinders have their axes at right angles to one another, the lengths of said cylinders being equal and the cross-sections of the cylinders corresponding to the cross-section of the pipes to be connected by the valve. The cylinder 4 pierces the cylinder 3 and closes its passageway. The semi-circle 6 shown in chain-dotted lines designates the peripheral path of the rotary body and shows at the same time the part-spherical form of sealing surfaces 7 at the ends of the cylinders 3 and 4. Sealing rings 8 are carried partly on flexible members 9 connected to the casing 1 and partly on a channel-shaped ring 9a fixed to a frame 10 with which a double-armed lever 11, 12 engages. The lever 12 is connected outside the casing with a nut 13 on a spindle 14, which is driven by a motor 15 to press the rings 8 against the surfaces 7 or release them. The rotary movement is transmitted by chain wheels 16 and chains 17 to spindles 18 which actuate the sealing rings 8 at the remaining pressure places, so that all the spindles, of which any suitable number are arranged around the casing, are rotated simultaneously, with the result that at all the pressure places the sealing rings 8 are simultaneously pressed against the sealing rings 7 or released from them.

Pressure release pipes 19 are arranged on the casing 1 and explosion valves 20 are also fixed to the casing.

The pipe in which the valve illustrated is used is bolted to flanges 11a on the valve. The flanges 11a are fixed to short lengths of pipe 10a. When the sealing rings 8 are moved the channels 9a slide on the pipes 10a on which they are a close fit to provide a seal. Instead of this sliding joint however the channels 9a may be connected to the pipes 10a by short sleeves made of flexible material. This arrangement is in some ways preferable since it provides a positive seal.

When the rotary member is in the position in which it allows gas to pass through, the sealing rings 8 are pressed by means of the linkage 11, 12 which is actuated by the spindles 14, against the part-spherical sealing surfaces 7. By this means the gas pipe is securely sealed from the outside atmosphere. Further, owing to the flexible connections 9 between the sealing ring 8 and the casing 1 ventilation of the space of the casing which is outside the pipe is possible and if, during operation, one of the sealing rings 8 is damaged, the gas flowing past the defective seal is held in the casing by the connections 9 and is led into the atmosphere through the pipe 19. If the valve is to be closed the sealing rings 8 are released from the sealing surfaces 7 on the rotary member by actuating the spindles 14, 18 in the reverse direction and a motor 21 which drives the rotary body is switched on by the same electrical control and rotates the rotary member through 90° into the closing position.

What we claim is:

1. In a valve, the combination comprising a housing structure, coaxially disposed flanges on said housing structure, said flanges being adapted to be connected to the pipes of the pipeline controlled by said valve, a rotary member disposed therein, said rotary member consisting of two cylinders having their axes at right angles to one another, the length of said cylinders being equal and their cross-sections corresponding to the cross-sections of the pipes to be connected by the valve, one of the cylinders piercing and closing the second cylinder, sealing members having partly-spherical surfaces and being fixed to the ends of each of said cylinders, sealing rings adapted to be brought in contact with said sealing members, supporting rings for said sealing rings, flexible members having ends connected to said housing structure, said sealing rings and said supporting rings being connected to other ends of said flexible members, frames rigidly connected to said supporting rings, drive means operatively connected to said frames for displacing them together with said supporting rings and said sealing rings along the axes of said flanges oppositely to one another against said sealing members on the ends of said cylinders, and short lengths of tubes fixed to said flanges and extending into said housing structure in guiding and sealing relationship with said supporting rings.

2. A valve as claimed in claim 1, in which said drive means include lever linkages operatively connected to said frames, a plurality of spindles, drivingly connected to said linkages, disposed along the perimeter of said supporting rings and adapted to actuate said lever linkages, said drive means being operatively connected to one of said spindles, and means positively coupling said one spindle to the other of said spindles.

3. A valve as claimed in claim 1, further comprising air-release pipes connected to said housing structure and adapted to ventilate the space between said rotary member and said housing structure.

4. A valve as claimed in claim 1, further comprising mechanism for rotating said rotary member and a switching device controlling said mechanism, said switching device being coupled to said drive means, thereby causing the movements of said drive means and said rotary member to occur in succession.

References Cited in the file of this patent

UNITED STATES PATENTS

| | | |
|---|---|---|
| 1,762,818 | Hoffman | June 10, 1930 |
| 1,834,870 | Rogers | Dec. 1, 1931 |
| 1,901,961 | Grant | Mar. 21, 1933 |
| 2,690,191 | Mosley | Sept. 28, 1954 |

FOREIGN PATENTS

| | | |
|---|---|---|
| 427,446 | Italy | Nov. 20, 1947 |
| 189,162 | Great Britain | Nov. 13, 1922 |
| 626,706 | France | May 16, 1927 |